(12) United States Patent
Richey

(10) Patent No.: US 6,190,705 B1
(45) Date of Patent: Feb. 20, 2001

(54) SYRUPS AND COMESTIBLE COATINGS MADE THEREFROM CONTAINING AN EMULSION

(75) Inventor: Lindell C. Richey, Lake Zurich, IL (US)

(73) Assignee: Wm. Wrigley Jr. Company, Chicago, IL (US)

( * ) Notice: Under 35 U.S.C. 154(b), the term of this patent shall be extended for 0 days.

(21) Appl. No.: 09/513,718

(22) Filed: Feb. 24, 2000

Related U.S. Application Data

(63) Continuation of application No. PCT/US97/15235, filed on Aug. 27, 1997.

(51) Int. Cl.⁷ .................................................. A23A 3/30
(52) U.S. Cl. .................. 426/5; 426/3; 426/4; 426/302; 426/303; 426/304; 426/305
(58) Field of Search .......................... 426/3, 4, 5, 6, 426/302, 303, 304, 305

(56) References Cited

U.S. PATENT DOCUMENTS

| | | | |
|---|---|---|---|
| 4,135,005 | 1/1979 | Cheng | 426/659 |
| 4,786,491 | 11/1988 | Patel | 424/48 |
| 4,931,293 | 6/1990 | Cherukuri et al. | 426/5 |
| 4,971,798 | * 11/1990 | Coia et al. | 424/440 |
| 5,135,761 | 8/1992 | Dave et al. | 426/5 |
| 5,248,508 | 9/1993 | Reed et al. | 426/5 |
| 5,270,061 | 12/1993 | Reed et al. | 426/5 |
| 5,273,763 | 12/1993 | Merz et al. | 426/101 |
| 5,376,389 | * 12/1994 | Reed et al. | 426/5 |
| 5,380,530 | * 1/1995 | Hill | 424/440 |
| 5,409,715 | 4/1995 | Meyers | 426/5 |

FOREIGN PATENT DOCUMENTS

| | | | |
|---|---|---|---|
| 0736258 | * 10/1996 | (EP) | . |
| 0 736 258 A2 | 10/1996 | (EP) | . |
| WO 91/17821 | 11/1991 | (WO) | . |
| WO 95/07622 | 3/1995 | (WO) | . |
| WO 95/07625 | 3/1995 | (WO) | . |
| WO 99/09840 | 3/1999 | (WO) | . |

\* cited by examiner

*Primary Examiner*—Chhaya D. Sayala
(74) *Attorney, Agent, or Firm*—Brinks Hofer Gilson & Lione; Steven P. Shurtz

(57) ABSTRACT

A coating syrup is made using an emulsion of an emulsifier and either an oil-based flavoring agent, a food acid or both. The emulsion may be used to coat comestibles, such as pellets of chewing gum. The emulsion helps to retain volatile flavors that may otherwise flash off during the coating operation.

31 Claims, No Drawings

SYRUPS AND COMESTIBLE COATINGS MADE THEREFROM CONTAINING AN EMULSION

CROSS-REFERENCE TO RELATED APPLICATION

The present application is a continuation of PCT application Ser. No. US97/15235, filed Aug. 27, 1997, which designated the United States, and which is incorporated herein by reference.

BACKGROUND OF THE INVENTION

The present invention relates to coatings for comestibles, and particularly to chewing gum pellet coatings and syrups therefore that are made using an emulsion of flavor, acid or both.

Comestibles, and chewing gum in particular, often in pellet form, are frequently enclosed with a hard or soft coating. Coatings provide an opportunity for the manufacturer to vary product characteristics such as taste, appearance and nutritional value.

Historically the coatings were made from sugar syrups. In resent years, efforts have been devoted to producing sugarless hard coatings for use on chewing gum. Sugarless coatings which have been investigated include coatings containing compounds such as xylitol, sorbitol, mannitol, hydrogenated starch hydrolyzates, enythritol, and mixtures thereof. For example, See U.S. Pat. Nos. 5,248,508; 5,207,061 and 5,376,389; and PCT Publication Nos. WO 95/07622 and WO 95/07625.

Many coatings for comestible, and particularly for chewing gum, include a flavor. Most flavors used in coatings are oil based. The coatings are typically made from aqueous syrups. The coatings are built up by applying an aliquot of syrup to the product to be coated and allowing the syrup to coat the product and then dry. Often the flavor is applied between coating layers of syrup, but may be mixed with the syrup. One difficulty arises from the fact that the coating syrups are applied in a hot liquid state so that they can more rapidly dry. As a result, volatile flavors, such as fruit flavors, cannot be mixed into the coating syrup because the volatile components of the flavor will evaporate during the coating operation. Even if the flavors are preblended with the coating syrup just prior to being applied to the cores, there is still undesirable flavor loss.

Sometimes it is desirable to use food grade acid, such as citric acid, in a coating so that the coating will have a tart taste. One problem is that if acid is mixed with a hot aqueous sugar syrup, the sugar will start undergoing inversion, and will then not form a hard coating and will be difficult to dry because the inverted sugar prevents crystallization.

Also, it has been discovered that when acid is added to sugarless syrups which are then used to make a sugarless coating, the resulting hard shell coating has a tendency to crack.

Thus, while there have been many improvements made to coatings, and particularly sugarless coatings, there is still a need for a way to reduce volatilization of flavor compounds used in making coatings, and overcome the drawbacks noted above when including a food acid in a coating.

SUMMARY OF THE INVENTION

It has been discovered that by mixing the flavor, the acid, or both, with an emulsifier and forming an emulsion before combining the flavor and/or acid with the coating syrup, the above noted deficiencies are overcome. In a first aspect, the invention is a coating syrup for use in forming a coating on a comestible, the coating syrup comprising a flavor emulsion which contains water, an oil based flavoring agent and an emulsifier; a bulk sweetener; and a solvent.

In a second aspect, the invention is a coating syrup for use in forming a coating on a comestible, the coating syrup comprising an acid emulsion which contains water, a food grade acid and an emulsifier; a bulk sweetener; and solvent.

In a third aspect, the invention is an emulsion comprising an oil based flavoring agent; a food grade acid; water; and an emulsifier.

In a fourth aspect, the invention is a coated comestible comprising a core and a coating covering the core, the coating comprising a bulk sweetener and an oil based flavoring agent mixed with an emulsifier.

In a fifth aspect, the invention is a coated comestible comprising a core and a coating covering the core, the coating comprising a bulk sweetener and a food grade acid mixed with an emulsifier.

In a sixth aspect, the invention is a method of forming coating on a comestible comprising the steps of providing a core; providing a solution of a bulk sweetener and a solvent; providing an emulsion of an oil based flavoring agent, water and an emulsifier; combining the bulk sweetener solution and the emulsion together and applying the combination to cover the core; and drying the solvent to form a dry coating on the core.

In a seventh aspect, the invention is a method of forming a coating on a comestible comprising the steps of providing a core; providing a solution of a bulk sweetener and a solvent; providing an emulsion of food grade acid, water and an emulsifier; combining the bulk sweetener solution and the emulsion together and applying the combination to cover the core; and drying the solvent to form a dry coating on the core.

The present invention provides improved flavor an/or tartness to sugar and/or sugarless coated comestibles, and chewing gum products in particular. For sugar coated chewing gum, this invention allows acids that give flavor tartness to be added to the coating without causing inversion of the sugar syrup used for coating. For coatings where an acid is added to give flavor tartness with sugarless sweeteners such as xylitol, problems with the shell cracking can be eliminated. This invention allows for a wide variety of potential uses of tart/acid type flavors not previously available in coated pellet gums.

In the preferred embodiment of the invention, flavors are emulsified with gum arabic and then added to the coating, resulting in improved flavor retention. In addition, acids can be added to this emulsion or, in the case where no flavor is added, acid is premixed with a solution of gum arabic or another gum-type emulsifier, and then blended with the coating syrup as it is applied to gum cores. In this way, there is minimal contact between the acid and the coating syrup and minimal detrimental effects on the sugar or sugarless coating.

These and other advantages of the invention will be best understood in light of the following detailed description of the invention and its preferred embodiments.

DETAILED DESCRIPTION OF THE INVENTION AND PREFERRED EMBODIMENTS THEREOF

All percentages herein are weight percentages unless otherwise specified. The term "chewing gum" also includes bubble gum and the like.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar and gum tragacanth, insoluble carbonates like calcium carbonate or magnesium carbonate, and talc. Antitack agents may also be added as panning modifiers, which allow the use of a variety of carbohydrates and sugar alcohols to be used in the development of new panned or coated gum products.

Chewing gum products of the present invention may be made with a variety of chewing gum pellet compositions.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laureate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between about 10% and about 50% of the gum and most preferably from about 20% to about 30% of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in gum.

As mentioned above, the coating of the present invention may be used on sugar-free gum formulations. However, sugar-gum formulations may also use the coating of the present invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol and the like, alone or in any combination.

Depending on the particular sweetness release profile and shelf-stability needed, coated or uncoated high-intensity sweeteners may be used in the chewing gum composition. High-intensity sweeteners, preferably aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame is preferred when aspartame is used.

Flavors contemplated for use in the chewing gum products of the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition, or added as part of the gum base.

Aqueous syrups, such as corn syrup and hydrogenated corn syrup may be used, particularly if their moisture content is reduced. This can preferably be done by coevaporating the aqueous syrup with a plastcizer, such as glycerin or propylene glycol, to a moisture content of less than 10%. Preferred compositions include hydrogenated starch hydrolysate solids and glycerin. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor is typically added with the final portion of the bulking agent. Other optional ingredients are added in the batch in a typical fashion, well known to those of ordinary skill in the art.

As noted above, the coating may contain ingredients such as flavoring agents, as well as artificial sweeteners and dispersing agents, coloring agents, film formers and binding agents. Flavoring agents contemplated for use in coatings of the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be used in an amount such that the coating will contain from about 0.2% to about 1.2% flavoring agent and preferably from about 0.7% to about 1.0% flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.5% to about 0.3% and preferably from about 0.10% to about 0.15% artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1% to about 1.0% and preferably from about 0.3% to about 0.6% of the agent.

Coloring agents are preferably added directly to the syrup in the dye or lake form. Coloring agents contemplated by the present invention include food quality dyes. Film formers preferably added to the syrup include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

The coating is initially present as a liquid syrup which contains from about 30% to about 80% or 85% of the coating ingredients previously described herein, and from about 15% or 20% to about 70% of a solvent such as water. In general, the coating process is carried out in a rotating pan. Sugarless gum center tablets to be coated are placed into the rotating pan to form a moving mass.

The material or syrup which will eventually form the coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In a hard coating panning procedure, syrup is added to the gum center tablets at a temperature range of from about 100° F. to about 200° F. Preferably, the syrup temperature is from about 130° F. to about 170° F. Most preferably, the syrup temperature should be maintained at about 150° F. throughout the process in order to prevent the polyol or sugar in the syrup form crystallizing. The syrup may be mixed with, sprayed upon, poured over, or added to the gum center tablets in any way known to those skilled in the art.

In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a coated comestible containing about 10% to about 65% coating. Preferably, the final product will contain from about 20% to about 50% coating.

Those skilled in the art will recognize that in order to obtain a plurality of coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent emulsion may be added to the syrup, or applied to the gum center tablets while the syrup coating is drying or after the coating has dried. Furthermore, the flavoring agent emulsion may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 70° to about 115° F. More preferably, the drying air is in the temperature range of from about 80° to about 100° F., The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around or through the bed of the syrup coated gum centers at a flow rate, for large scale operations, of about 2800 cubic feet per minute. If lower quantities of material are being processed, or if smaller equipment is used, lower flow rates would be used.

As noted above, flavors have been added to a sugar coating of pellet gum to enhance the overall flavor of gum. These flavors include spearmint flavor, peppermint flavor, wintergreen flavor, and fruit flavors. These flavors are generally preblended with the coating syrup just prior to applying it to the core or added together to the core in one or more coating applications in a revolving pan containing the cores. Generally, the coating syrup is very hot, about 150° to 200°

F., and the flavor may volatilize if preblended with the coating syrup too early.

The concentrated coating syrup is applied to the gum cores as a hot liquid, the sugar or polyol allowed to crystallize, and the coating then dried with warm, dry air. This is repeated in about 30 to 80 applications to obtain a hard shell coated product having an increased weight gain of about 50%. A flavor is applied with one, two, three or even four or more of these coating applications. Each time flavor is added, several non-flavored coatings are applied to cover the flavor before the next flavor coat is applied. This reduces volatilization of the flavor during the coating process.

For mint flavors such spearmint, peppermint and wintergreen, some of the flavor components are volatilized, but sufficient flavor remains to give a product having a strong, high impact flavor. Fruit flavors, that may contain esters, are more easily volatilized and may be flammable and/or explosive. Thus, heretofore these type of fruit flavors have not generally been used in coatings.

However, using the present invention, coatings have been invented that contain fruit flavors, and a fruit flavor that is emulsified appears to be less volatile. For example, a strawberry flavor having a flash point of 100° F., after being emulsified at 20% active flavor level, becomes a flavor with a flash point of 133° F., which is a significant increase in the flash point. Flavors having a higher flash point are preferred since the danger of fire or explosion is reduced. In some embodiments of the invention, fruit flavors may be developed specifically for coating having less volatiles and a higher flash point. Also, use of emulsified flavors in a gum coating allows more flavor to remain on the gum pellet surface during the drying stage, giving the gum more flavor in the coating and yielding a gum product with a stronger flavor impact.

In the preferred embodiment of this invention, flavors are preblended with a gum arabic solution to become emulsified, and then mixed with the coating syrup at the time it is being applied to the cores. While forced air drying is carried out as usual when coating layers without flavor are being applied, after the application of a syrup combined with an emulsified flavor the forced air drying is turned off to reduce volatilization.

The emulsifiers that may be used in the present invention include mono- and di-glycerol esters of fatty acids, polyglycerol esters, sorbitan esters and other common emulsifiers that will increase the flashpoint of oil based flavors in aqueous solutions or otherwise reduce flavor loss that would occur if the emulsifier were not used. The preferred emulsifiers are gum-type emulsifiers such as gum arabic, gum talha, xanthan gum, and carrageenan, with gum arabic being most preferred. Gum arabic not only acts as an emulsifier, but also has beneficial film forming and adhesive attributes useful in making comestible coatings. An emulsion stabilizer may also be used. Gum arabic does not need a stabilizer. Gum-type emulsifiers are particularly preferred when an acid is used in the coating. The preferred flavor emulsions will comprise about 5% to about 30% flavor, about 1% to about 50% emulsifier and about 45% to about 94% water.

Using the present invention, flavors may be added to a sugar coating system using sucrose, dextrose, or other sugars used to make soft or hard coatings. This method is especially useful for sugarless coatings which are made with various polyols such xylitol, sorbitol, maltitol, lactitol, hydrogenated isomaltulose, or erythritol. After being emulsified, flavors may be added with the coating syrup as described above, and then covered with additional layers of the sugar or polyol syrups. Also, the flavor coating may be covered with layers of sugar or polyol powder blends when soft coatings are desired.

When a food grade acid is added to a sugar coating to give flavor enhancement, the acid should be added evenly throughout the coating to reduce "hot spots" of tartness. The preferred food grade acids include citric acid, malic acid, tartic acid and mixtures thereof. In many cases, the acid should be preblended with the coating syrup before being applied to the cores. As noted previously, however, without the present invention this would not be an acceptable procedure, since acid added to sugar solutions causes inversion of the sugar mixture which results in a poor coating. For this reason, there are very few sugar coated products with a tart flavor in the coating.

Sugar inversion is not a concern for sugarless coatings with polyols, since polyols are not inverted in the presence of acid in solution. Therefore, a product was developed that contained citric acid in a xylitol coating. The acid was dissolved in the xylitol coating solution before the solution was applied to the cores. However, during the storage of this product, cracks in the coating developed. It was felt that the cracks in the coating were due to the use of acid in the xylitol coating, since other xylitol coated products did not develop cracks.

Xylitol coating solutions were compared to determine the effects of acid on the coating solution. With acid, xylitol syrups appeared thinner so the following solutions were prepared with and without acid to determine viscosity differences:

|  | Solution % |
|---|---|
| 40% Gum Talha/water premix | 24.1 |
| Xylitol | 67.8 |
| Water | 7.5 |
| Titanium Dioxide | 0.6 |
|  | 100.0 |

This mixture was prepared and held at 185° F., and pH and Brookfield viscosity were measured. To this solution was added 0.85% powdered citric acid. The pH and viscosity was again measured. Results are:

|  | No Acid Syrup | With Acid Syrup |
|---|---|---|
| Brookfield Viscosity, Spindle 4, Speed 10, 185° F. | 140 cps | 100 cps |
| pH | 4.78 | 3.26 |

These results indicate that when citric acid is added to the coating syrup, the coating syrup becomes much thinner. Coating syrups should generally be about 100 to 200 cps to properly cover and spread evenly over the cores during coating. The reduced viscosity identified by these experiments may account for the above-noted cracking of the coating shell during storage.

When citric acid is added to the gum talha/water emulsion with the flavor and then added to the syrup coating just before it is applied to the cores, the hard shell formed does not crack and yields a quality coated product with good flavor, tartness, and shelf life.

A wide range of changes and modifications to the embodiments of the invention described above will be apparent to persons skilled in the art. For example, while the invention is described with respect to hard-coated chewing gum, it will be appreciated that the coating process is applicable to coating other food products, such as candies, in which a coating would have utility, and is also applicable to soft coatings.

EXAMPLES

The following gum formulas were made into pellets for coating.

|  | A | B | C |
|---|---|---|---|
| Base | 30.0 | 30.0 | 30.0 |
| Sorbitol | 43.55 | 53.2 | 52.7 |
| Talc | 11.0 | 6.0 | 6.0 |
| Glycerin | 8.0 | 6.0 | 6.0 |
| Encapsulated APM | 0.65 | 0.65 | 0.65 |
| APM | 0.15 | 0.15 | 0.15 |
| Captrin | 0.15 | — | — |
| Citric Acid | 4.00* | 1.50 | 2.0 |
| Fruit Flavor | 2.50 | 2.50 | 2.5 |
|  | 100.0 | 100.0 | 100.0 |

*Encapsulated Citric Acid

Example A Coating

Standard gum coating procedures were followed for preparation of a coating syrup made from xylitol. Gum talha, a panning modifier, was premixed in hot water to give a 40% solids solution. An 80% solids xylitol solution was prepared and heated to a boil, and 0.75% titanium dioxide was added to the xylitol solution. A 1 to 10 ratio of gum talha solution to xylitol solution was mixed and used as the coating syrup.

The flavor emulsion used in this example is a strawberry flavor. 25 parts of flavor were mixed with 40 parts of gum arabic in 60 parts of water. Powdered critic acid was added to this emulsion. For 1000 grams of gum cores, 3.7 grams of citric acid was added to 8.0 grams of flavor/gum arabic emulsion. This was split into three portions and applied when the coating syrup was applied at coats 10, 15 and 20. Coating was then completed with additional xylitol/gum talha coatings to give a 50% weight increase.

Example B Coating

Standard gum coating procedures were followed for preparation of a coating syrup made from maltitol. Gum talha, again as a panning modifier, was premixed in hot water to give a 40% solids solution. A 70% solids maltitol solution was prepared and heated to a boil, and 0.67% titanium dioxide was added to the maltitol solution. A 1 to 9 ratio of gum talha solution to maltitol solution was mixed and used as the coating syrup.

The flavor emulsion used on this example was also a strawberry flavor, also made from 40 parts gum arabic, 60 parts water and 25 parts flavor. Powdered citric acid and aspartame sweetener were added to this emulsion. For 1000 grams of gum cores, 3.7 grams of citric acid, and 1.9 gram of aspartame sweetener were added to 8.0 grams of flavor/gum arabic emulsion. This was split into three portions and applied at coats 10,15 and 20. Coating was then completed with additional maltitol/gum talha coatings to give a 50% weight increase.

Example C Coating

Production scale coating processes were followed for preparation of a coating syrup. 55 kg of gum talha, used as a panning modifier, was premixed in hot water to give a 40% solids solution. 506 kg of xylitol was used to make a 90% solids xylitol solution at boiling, then held at 70–80°C. 5.1 kg (0.9%) titanium dioxide was added to the xylitol solution. A 1 to 3 ratio of gum talha solution to xylitol solution was blended and used as the coating syrup in the initial coating stages for about 32 coating applications. An 80% solids xylitol solution was then prepared and 0.9% titanium dioxide added. This was then mixed with the gum talha solution at a ratio of 1 to 9 gum talha solution to xylitol solution. This mixture was then used in the next 8–10 coats or as needed to give an increased pellet weight of 50%.

A flavor emulsion made from 40 parts gum arabic, 60 parts water and 25 parts flavor was used in this production coating example. A 4.08 kg quantity of powdered citric acid was blended with 8.7 kg of the flavor emulsion and the emulsion split in two equal portions. One portion was added with coat 16 and the other with coat 28. 1100 kg of cores were coated. The cores originally weighed about 1 g apiece, and were coated to a weight of about 1.53 g per piece.

Product coated with acid in this manner showed no cracking of the hard shell during storage, compared to product made by adding citric acid preblended in the xylitol syrup.

It is preferred to mix gum arabic with the flavor before mixing the flavor with the coating syrup because the gum arabic has to be fairly concentrated to act as an emulsifier, and if it were mixed with the coating syrup first it may not emulsify the flavor mixed in later. The flavor emulsion may be combined with the coating syrup either as a premixture before both are supplied to the coating equipment, or more preferably added to the coating equipment separately but simultaneously. On production scale equipment this may be accomplished by pumping aliquots of both the coating syrup and the flavor emulsion through an in-line static mixer, and thereafter spraying both together onto the cores. Alternatively, the coating syrup and flavor emulsion can be introduced into the coating equipment sequentially, and thus the flavor emulsion is combined with the bulk sweetener coating syrup on the surface of the comestible, or forms a separate layer if the previous coating layer has already been dried.

One of the benefits of the process of Example B is that the high intensity sweetener is not in the hot coating syrup for extended periods of time during which it could degrade. Also, the high intensity sweetener and the flavor are in the same layer of the coating, and hence are released simultaneously.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A coating syrup for use in forming a coating on a comestible, the coating syrup comprising:
   a) a flavor emulsion comprising:
      i) water,
      ii) an oil-based flavoring agent and
      iii) an emulsifier;
   b) a bulk sweetener; and
   c) a solvent.

2. The coating syrup of claim 1 wherein the solvent comprises water.

3. The coating syrup of claim 1 wherein the bulk sweetener is selected from the group consisting of sucrose, dextrose, xylitol, sorbitol, maltitol, hydrogenated isomaltulose, lactitol, erythritol and mixtures thereof.

4. The coating syrup of claim 1 wherein the flavor emulsion further comprises an acid and said emulsifier is selected from the group consisting of gum arabic, gum talha, xanthan gum, carrageenan and mixtures thereof.

5. The coating syrup of claim 4 wherein the acid is selected from the group consisting of citric acid, malic acid, tartaric acid and mixtures thereof.

6. The coating syrup of claim 1 wherein the flavoring agent is selected from the group consisting of fruit flavors, spearmint flavor, peppermint flavor and wintergreen flavor.

7. The coating syrup of claim 1 wherein the emulsifier is selected from the group consisting of gum arabic, gum talha, xanthan gum, carrageenan and mixtures thereof.

8. The coating syrup of claim 1 wherein the flavor emulsion comprises about 1% to about 50% of an emulsifier, about 45% to about 94% water and about 5% to about 30% flavor.

9. An emulsion comprising:
   a) about 5% to about 30% of an oil-based flavoring agent;
   b) a food grade acid;
   c) about 45% to about 94% water; and
   d) about 1% to about 50% of an emulsifier selected from the group consisting of gum arabic, gum talha, xanthan gum, carrageenan and mixtures thereof.

10. The emulsion of claim 9 wherein the oil based flavoring agent comprises a fruit flavor and the emulsifier comprises gum arabic.

11. A coated comestible comprising:
    a) a core comprising a comestible; and
    b) a coating covering said core comprising:
       i) a bulk sweetener and
       ii) an oil-based flavoring agent premixed with water and an emulsifier to form an emulsion.

12. The coated comestible of claim 11 wherein the core comprises a chewing gum pellet.

13. The coated comestible of claim 11 wherein the coating comprises layers and the mixture of emulsifier and flavoring agent is in a separate layer from the bulk sweetener.

14. The coated comestible of claim 11 wherein the coating comprises layers and at least one layer comprises both the mixture of emulsifier and flavoring agent and the bulk sweetener.

15. The coated comestible of claim 11 wherein the coating further comprises a food grade acid and said emulsifier is selected from the group consisting of gum arabic, gum talha, xanthan gum, carrageenan and mixtures thereof.

16. The coated comestible of claim 15 wherein the coating comprises layers and the acid and mixture of emulsifier and flavoring agent are in the same layer.

17. The coated comestible of claim 16 wherein the acid, mixture of flavor and emulsifier and the bulk sweetener are all in a common layer.

18. The coated comestible of claim 11 wherein the coating comprises a hard shell coating.

19. The coated comestible of claim 11 wherein the bulk sweetening agent comprises a sugar sweetener.

20. The coated comestible of claim 11 wherein the bulk sweetening agent comprises a sugarless sweetener.

21. The coated comestible of claim 11 wherein the coating further comprises a high-intensity sweetener.

22. The coated comestible of claim 11 wherein the comestible comprises chewing gum; the bulk sweetener comprises xylitol; the oil-based flavoring comprises a fruit-flavor; the emulsifier comprises gum arabic; and the coating further comprises a food grade acid.

23. A method of forming a coating on a comestible comprising the steps of:
    a) providing a core comprising the comestible;
    b) providing a solution of a bulk sweetener and a solvent;
    c) providing an emulsion of an oil-based flavoring agent, water and an emulsifier;
    d) combining the bulk sweetener solution and the emulsion together and applying the combination to cover the core; and
    e) drying the solvent to form a dry coating on the core.

24. The method of claim 23 wherein the bulk sweetener solution and the emulsion are premixed before being applied to cover the core.

25. The method of claim 23 wherein the bulk sweetener solution and the emulsion are combined as they are applied to the core.

26. The method of claim 23 wherein the bulk sweetener solution is applied to the core and the emulsion is combined with the solution on the core.

27. The method of claim 23 wherein the dry coating on the core is formed by applying successive layers of bulk sweetener solution and drying each layer.

28. The method of claim 27 wherein multiple layers of bulk sweetener solution not combined with the emulsion are applied before and after applying the combination of the bulk sweetener solution and the emulsion.

29. The method of claim 23 wherein the emulsion further contains a food grade acid and said emulsifier is selected from the group consisting of gum arabic, gum talha, xanthan gum, carrageenan and mixtures thereof.

30. A method of forming a coating on a comestible comprising the steps of:
    a) providing a core comprising the comestible;
    b) providing a solution of a bulk sweetener and a solvent;
    c) providing an emulsion of a food grade acid, water and an emulsifier selected from the group consisting of gum arabic, gum talha, xanthan gum, carrageenan and mixtures thereof;
    d) combining the bulk sweetener solution and the emulsion together and applying the combination to cover the core; and
    e) drying the solvent to form a dry coating on the core.

31. The method of claim 30 wherein the bulk sweetener is a sugar sweetener.

* * * * *